(12) United States Patent
Spears et al.

(10) Patent No.: US 6,304,981 B1
(45) Date of Patent: Oct. 16, 2001

(54) ADAPTIVE SHUTDOWN SYSTEM AND METHOD FOR AN INFORMATION HANDLING SYSTEM

(75) Inventors: Cameron Spears, Lake Forest; Wenli Zhu, Trabuco Canyon, both of CA (US)

(73) Assignee: Gateway, Inc., N. Sioux City, SD (US)

( * ) Notice: Subject to any disclaimer, the term of this patent is extended or adjusted under 35 U.S.C. 154(b) by 0 days.

(21) Appl. No.: 09/174,712

(22) Filed: Oct. 19, 1998

(51) Int. Cl.[7] ............................. H02H 3/05; G06F 11/00
(52) U.S. Cl. ........................... 714/24; 714/22; 714/815
(58) Field of Search ........................... 714/24, 22, 55, 714/706, 721, 731, 815; 713/324

(56) References Cited

U.S. PATENT DOCUMENTS

| | | | |
|---|---|---|---|
| 5,155,842 | * | 10/1992 | Rubin ................................. 395/575 |
| 5,381,554 | * | 1/1995 | Langer et al. .................... 395/750 |
| 5,615,353 | * | 3/1997 | Lautzenheiser ................. 395/463 |
| 5,717,934 | * | 2/1998 | Pitt et al. ........................ 395/750 |
| 5,793,124 | * | 8/1998 | Mitzaki ............................. 307/66 |
| 6,073,173 | * | 6/2000 | Bittinger et al. ................ 709/224 |
| 6,137,292 | * | 10/2000 | Hirsch et al. .................. 324/427 |

* cited by examiner

Primary Examiner—Robert Beausoleil
Assistant Examiner—Tim Vo
(74) Attorney, Agent, or Firm—Suiter & Associates PC; Kevin E. West (57) ABSTRACT

A system for effecting a shutdown of a networked information handling system automatically determines the time interval required for the information handling system to reach a safe shutdown by continually calculating the time interval necessary to store all volatile information to non-volatile locations and shut down the system. In order to calculate the time interval, heuristics may be determined for various operating systems, applications, application environments, etc. Integration of the system of the present invention may be determined by a particular condition, configuration, and/or environment at any given period of time, and may, for example, be incorporated in environments such as a UPS (Uninterruptable Power Supply) environment or a fault tolerant CPU (Central Processor Unit) shutdown environment.

50 Claims, 7 Drawing Sheets

ADAPTIVE SHUTDOWN SYSTEM AND METHOD FOR AN INFORMATION HANDLING SYSTEM

FILED OF THE INVENTION

The present invention is generally related to information handling systems including computer systems and related devices which store data in at least one of volatile and non-volatile memory, and more particularly to a system and method for controlling the shutdown of an information handling system.

BACKGROUND OF THE INVENTION

High-end information handling systems such as, for example, network computer systems utilizing a client/server architecture conventionally have features providing a means for automatically shutting down or resetting the system when a particular event occurs or is likely to occur. However, shutting down or resetting such a system, while running in a multi-user operating configuration without first ensuring all volatile data has been saved may cause catastrophic data loss.

Known to the art are information handling systems which allow a user, such as a system administrator or the like, to set as a user definable parameter the amount of time to allow the system to flush all volatile data into a non-volatile environment before the system shuts itself down or resets itself. However, the time parameter entered by the user is typically based on his or her "best guess" of the amount of time required to perform such an operation over an average of different operating parameters and conditions. Thus, a parameter value which is too long (one which perhaps is longer than a set of physical conditions will permit) may be selected by a user causing the system to not shut down properly. This increases the possibility damage to the system. Similarly, a parameter value which is too short (one which will not allow all volatile information to be properly stored) may be selected causing a loss of data as the information handling system shuts down.

Accordingly, it would be advantageous to provide a system for automatically determining the time required for an information handling system to reach a safe shutdown and then effecting such a shutdown thereby preventing catastrophic loss of data.

SUMMARY OF THE INVENTION

The present invention is directed to a novel system and method for automatically determining the time interval required for an information handling system such as a network computer system, or the like, to reach a safe shutdown, and then effecting such a shutdown. This may be accomplished, for example, by continually calculating the time interval necessary to store all information contained in volatile memory to non-volatile memory and shut down the system. In order to calculate shutdown time requirements, heuristics may be determined for various operating systems, applications, application environments, and the like.

The present invention may be utilized in information handling systems as a complementary technology in fault-tolerant schemas such as, for example, a fault tolerant CPU (Central Processor Unit) shutdown environment, or the like, wherein it is necessary to know how much time an operating system takes to save volatile data to non-volatile locations before resetting the information handling system. Similarly, the present invention may be utilized in conjunction with an Uninterruptable Power Supply (UPS) in a UPS environment wherein it is necessary to know how long the various components of an information handling system must continue to operate after an event occurs which requires the system to be powered down. For example, a UPS may provide power to several workstations of a network system. Utilizing the present invention, such a UPS might allow some workstations to power off sooner than others, thus maximizing the available reserve battery capacity of the UPS.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the presently preferred embodiments of the invention, examples of which is illustrated in the accompanying drawings.

Figure 1:
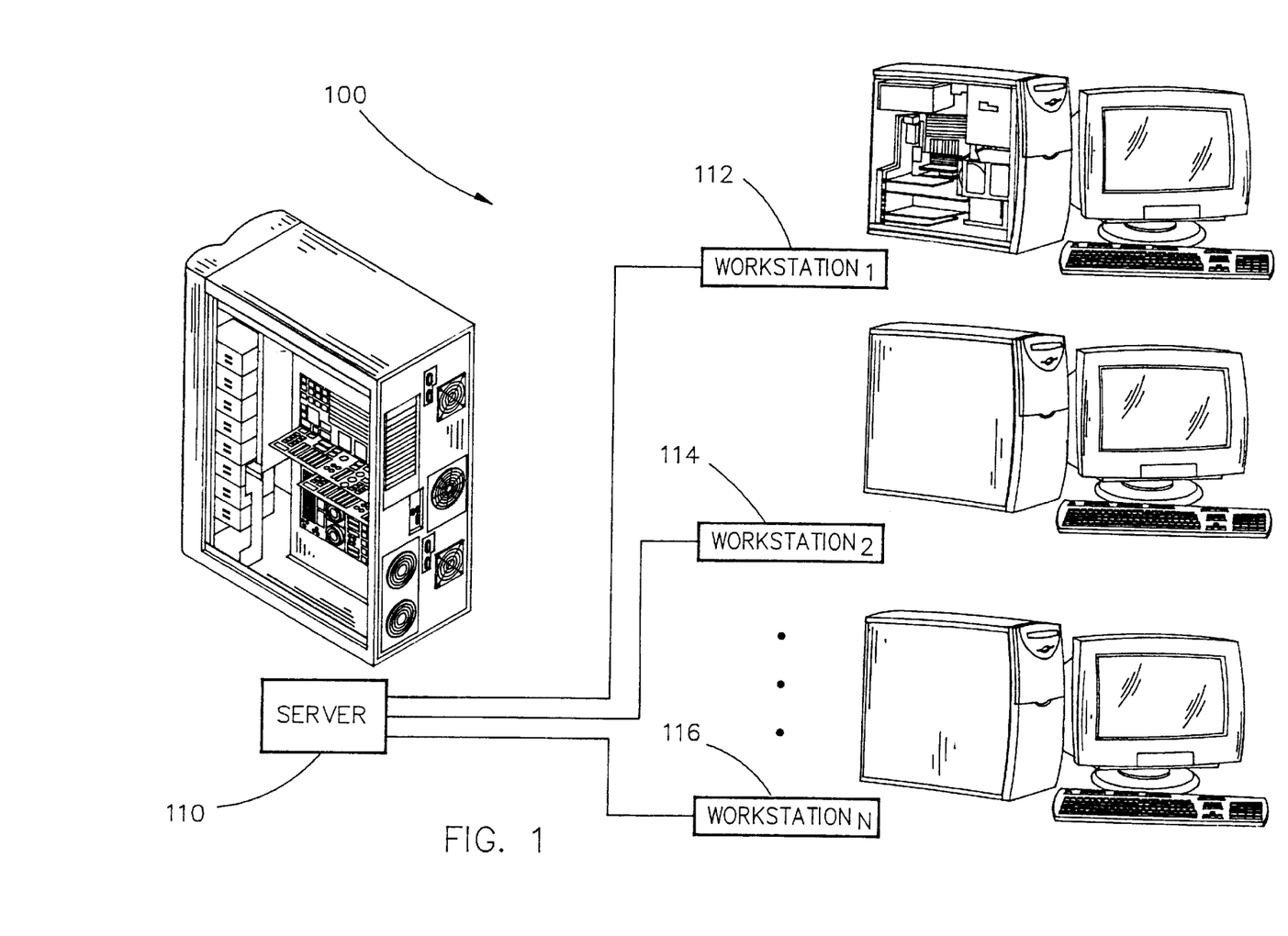
FIG. 1 is a bock diagram depicting a networked information handling system having a server supporting a plurality of workstations.
Figure 2:
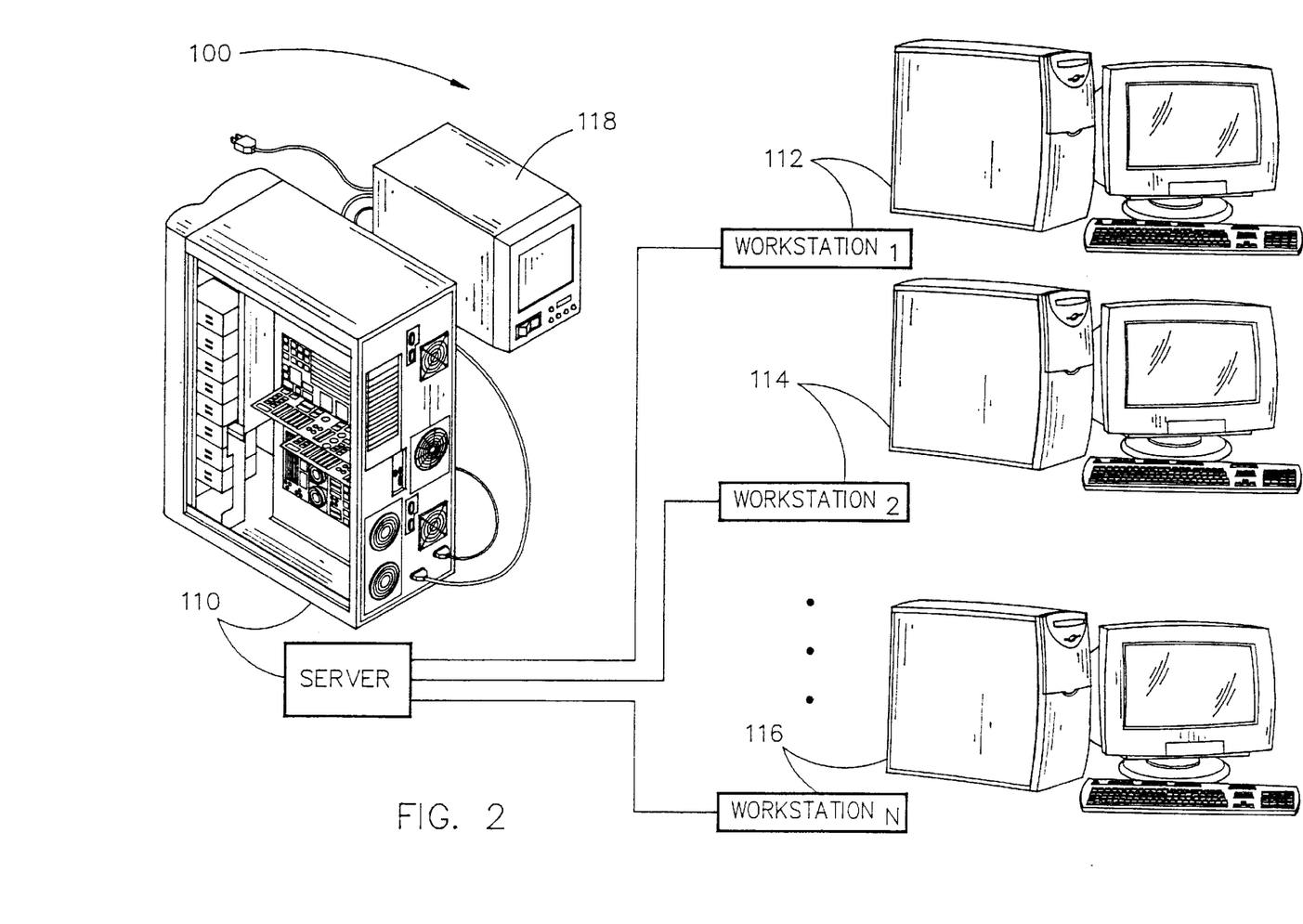
FIG. 2 is a block diagram depicting a networked information handling system having a server supporting a plurality of workstations wherein the server is powered by an Uninterruptable Power Supply (UPS)

Referring now to FIGS. 1 and 2, block diagrams depicting an exemplary networked information handling system in accordance with the present invention are shown. The information handling system 100 may include a network server 110 interconnected with one or more workstations 112, 114 & 116. Preferably, both the server 110 and each individual workstation 112, 114 & 116 are complete, stand alone information handling system such as, for example, a minicomputer, a mainframe computer, or a personal computer capable of operating independently of the networked system 100. The information handling system 100 may have a client/server architecture which makes use of distributed intelligence to treat both the server 112 and the individual workstations (or clients) 114, 116 & 118 as intelligent, programmable devices, thus exploiting the full information processing capacity of each. This may be accomplished by dividing the processing of information and data between the server 110 and each workstation 112, 114 & 116. For example, the server 110 may run administrative software that controls access by the workstations 112, 114 & 116 to the information handling system 100 and it resources, such as printers, disk drives, or the like, while each workstation 112, 114 & 116 may run software which is preferably optimized for user interaction.

As shown in FIG. 1, the information handling system 100 may operate in a fault tolerant CPU (Central Processor Unit) shutdown environment wherein operation of the information handling system 100 maybe monitored for events or conditions which would require the system to be shut down or reset. In this manner, the information handling system 100 may respond to a catastrophic event or fault, such as a power outage or a hardware failure, in a way that ensures that no data is lost and any work in progress is not corrupted. Alternatively, as shown in FIG. 2, the network system 100 may operate in an Uninterruptable Power Supply (UPS) environment. A power supply may provide electrical power to the server 110. Preferably, this power supply is an Uninterruptable Power Supply (UPS) 118 which may be connected between the server 110 and an electrical power source (not shown). The UPS 118 ensures that electrical power provided to the server 110 is not interrupted because of a loss of power from the power source (i.e.,blackout or brownout). Typically, the UPS 118 may include a battery for providing backup power and a sensor for detecting a loss of power from the power source. When the UPS sensor detects a loss of power, it automatically causes the UPS to switch the source of electrical power provided to the server from the external power source to the battery so that the server may continue operating until in may properly shut down without loss of data.

Figure 3:
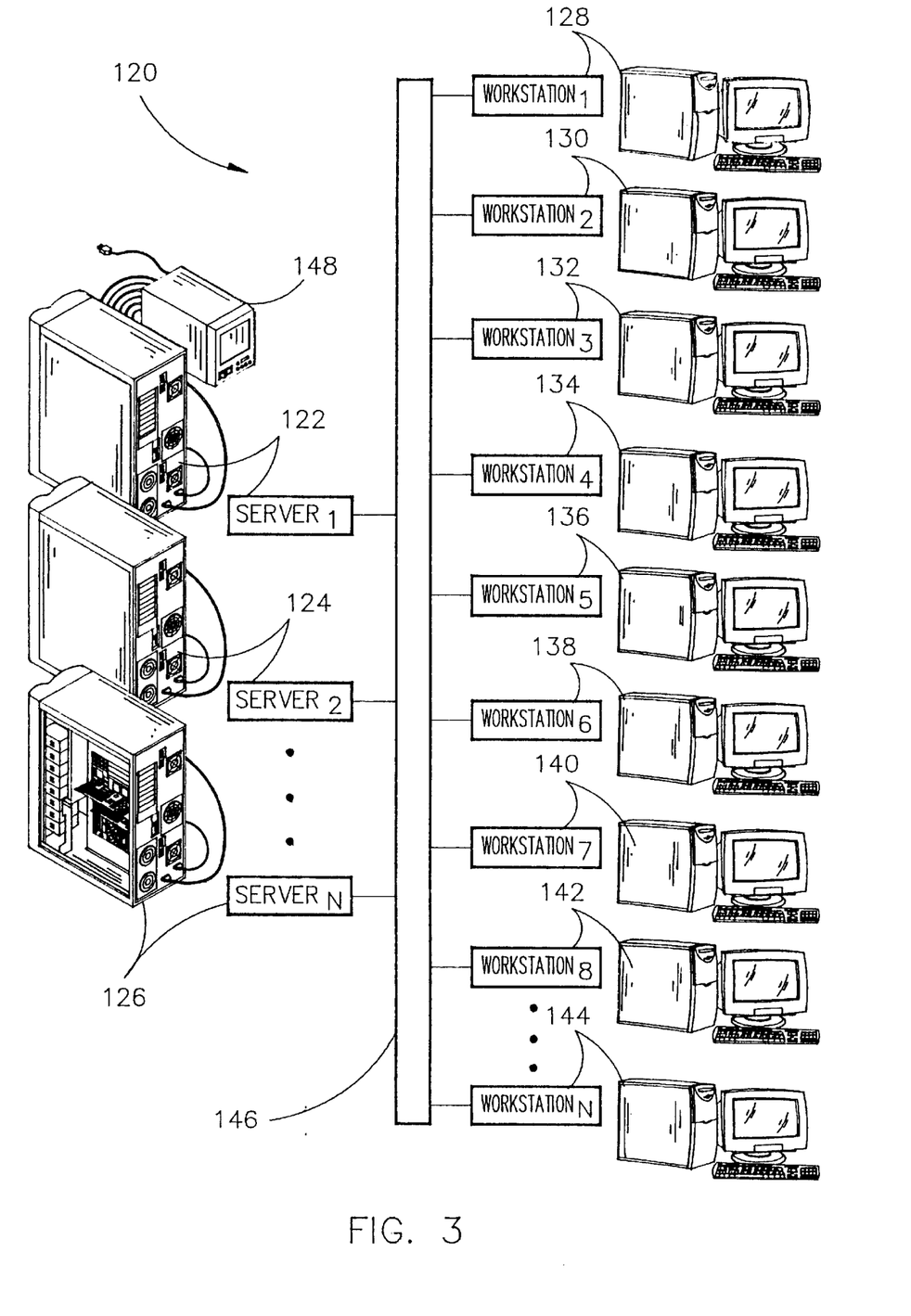
FIG. 3 is a block diagram depicting a networked information handling system including multiple servers and multiple workstations operating in a fault tolerant CPU environment.
Figure 4:
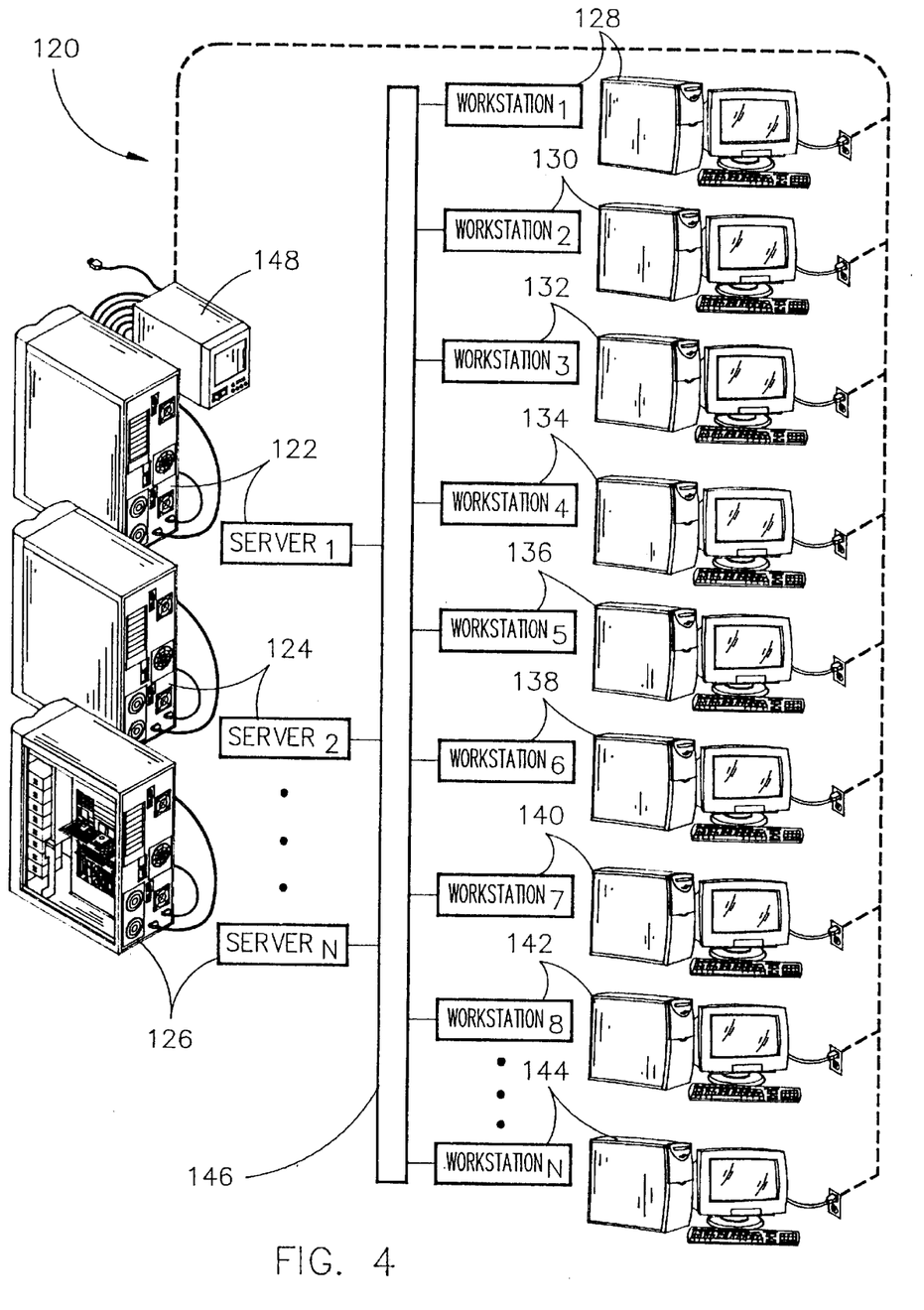
FIG. 4 is a block diagram depicting a networked information handling system including multiple servers and multiple workstations operating in an Uninterruptable Power Supply (UPS) environment.

Turning now to FIGS. 3 and 4, block diagrams depicting an information handling system including multiple servers and multiple workstations interconnected via a network are shown. The information handling system 120 includes a plurality of network servers 122, 124 & 126 and multiple workstations 128–144 interconnected via a network 146 such as a local area network (LAN), metropolitan area network (MAN), wide area network (WAN) or the like. The information handling system 120 may also include a power supply which may provide electrical power to the servers 122, 124 & 126 of the system 120. Preferably, this power supply is an Uninterruptable Power Supply (UPS) 148 which may be connected between each of the servers 122, 124 & 126 and a power source (not shown). As previously discussed in connection with FIG. 2, the UPS 148 may ensure that operation of the servers is not interrupted because of loss of power from the power source (i.e., blackout or brownout).

As shown in FIG. 3, the information handling system 120 may utilize a fault tolerant CPU (Central Processor Unit) shutdown environment wherein operation of the information handling system 120 may be monitored for events or conditions which would require the system to be shut down or reset. In this manner, the information handling system 120 may respond to a catastrophic event or fault, such as a power outage or a hardware failure, in a way that ensures that no data is lost and any work in progress is not corrupted. Alternatively, as shown in FIG. 4, the information handling system 120 may operate in a UPS environment wherein the power supply 148 may also provide electrical power to each workstation 128–144. Preferably, the UPS may be capable of powering down each server 122, 124 & 126 and workstation 128–144 independently, when operation of that server 122, 124 & 126 or workstation 128–144 is no longer required by the system 120.

Figure 5:
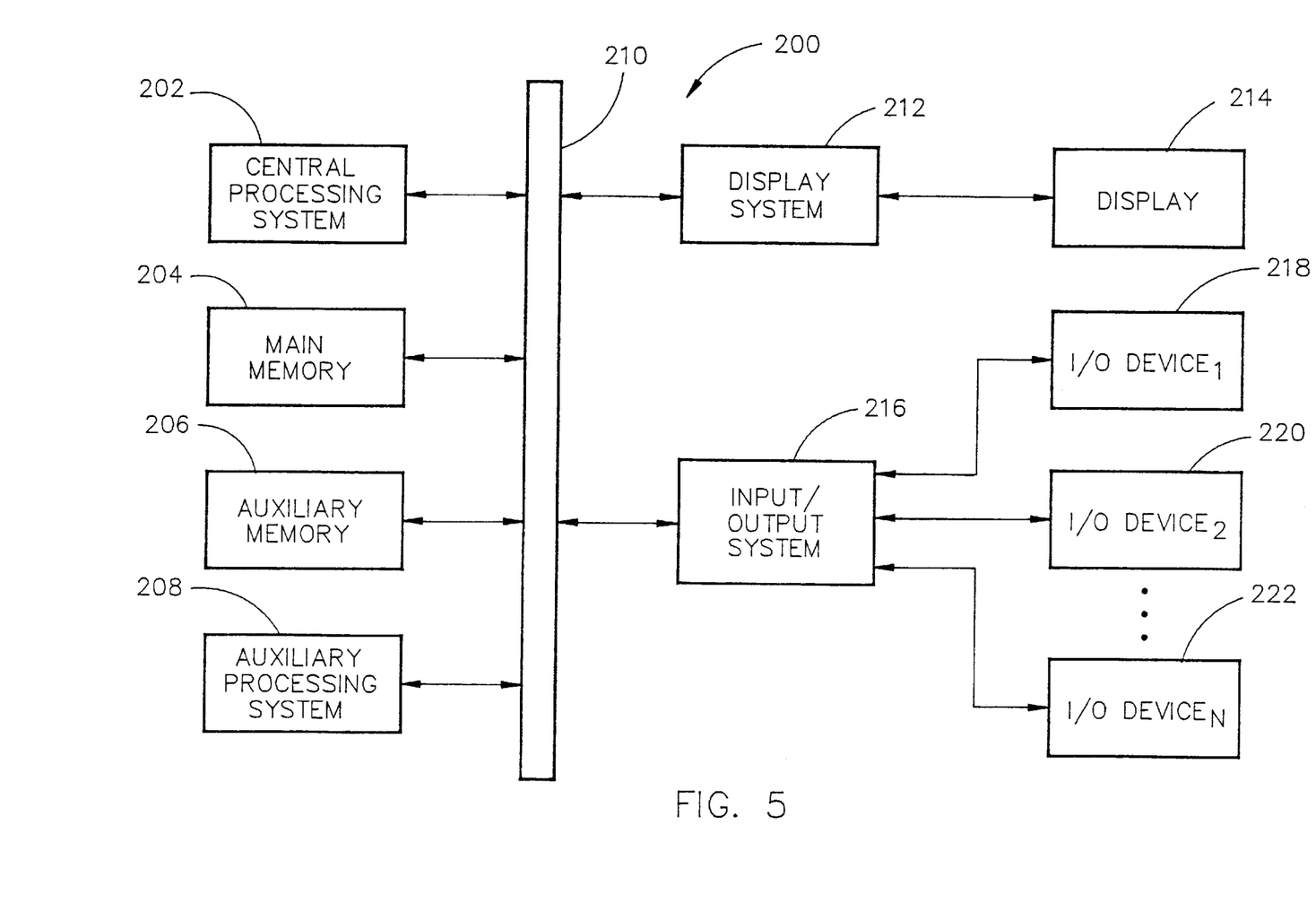
FIG. 5 is a block diagram depicting a typical hardware environment of a server or workstation of the information handling systems shown in FIGS. 1 through 4.

Referring now to FIG. 5, a hardware system in accordance with the present invention is shown. The hardware system shown in FIG. 5 is generally representative of the hardware architecture of a server or workstation of the information handling systems shown in FIGS. 1 through 4. The hardware system 200 is controlled by a central processing system 202. The central processing system 202 includes a central processing unit such as a microprocessor or microcontroller for executing programs, performing data manipulations and controlling the tasks of the hardware system 200. Communication with the central processing system 202 is implemented through a system bus 210 for transferring information among the components of the hardware system 200. The bus 210 may include a data channel for facilitating information transfer between storage and other peripheral components of the hardware system. The bus 210 further provides the set of signals required for communication with the central processing system 202 including a data bus, address bus, and control bus. The bus 210 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 200 include main memory 204, auxiliary memory 206, and an auxiliary processing system 208 as required. The main memory 204 provides storage of instructions and data for programs executing on the central processing system 202. The main memory 204 is typically semiconductor based memory such as dynamic random access memory (DRAM) and or static random access memory (SRAM). The auxiliary memory 206 provides storage of instructions and data that are loaded into the main memory 204 before execution. The auxiliary memory 206 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). The auxiliary memory 206 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. The hardware system 200 may optionally include an auxiliary processing system 208 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

The hardware system 200 may include a display system 212 for connecting to a display device 214, and an input/output (I/O) system 216 for connecting to one or more I/O devices 218, 220 up to N number of I/O devices 222. The display system 212 may comprise a video display adapter having all of the components for driving the display device, including video random access memory (VRAM), buffer, and graphics engine as desired. The display device 214 may comprise a cathode ray-tube (CRT) type display such as a monitor or television, or may comprise alternative type of display technologies such as a liquid-crystal display (LCD), a light-emitting diode (LED) display, or a gas or plasma display. The input/output system 216 may comprise one or more controllers or adapters for providing interface functions between the one or more I/O devices 218–222. For example, the input/output system 216 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. The input/output system 216 and I/O devices 218–222 may provide or receive analog or digital signals for communication between the hardware system 200 of the present invention and external devices, networks, or information sources. The input/output system 216 and I/O devices 218–222 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 200 of FIG. 5 by one having ordinary skill in the art would not depart from the scope or the spirit of the present invention.

The adaptive shutdown system and method of the present invention may be utilized to effect a non-catastrophic shutdown and/or reset of an information handling system as described in connection with FIGS. 1 through 5 by automatically determining the time interval required for the information handling system to reach a safe shutdown, and then effecting such a shutdown. This may be accomplished, for example, by continually calculating the time interval necessary to close all user applications and store all information stored in volatile memory locations to non-volatile memory locations (e.g., disk drives, etc.). In order to calculate this time interval, heuristics may be determined for various operating systems, applications, application environments, and the like. Integration of the present invention in an information handling system may determined by the particular environment (e.g., UPS (Uninterruptable Power Supply) environment, fault tolerant CPU (Central Processor Unit) shutdown environment, or the like) employed by the system.

Figure 6:
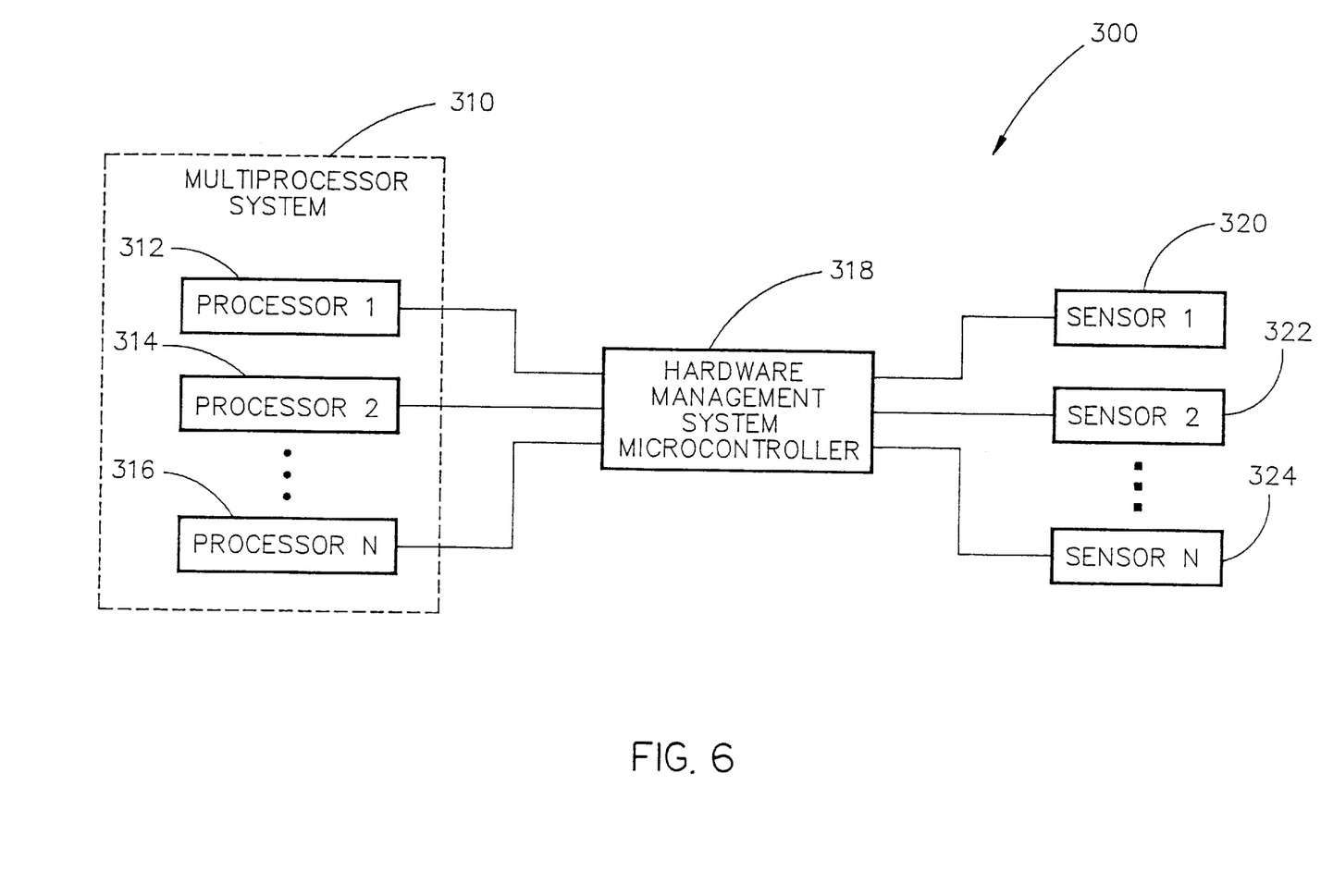
FIG. 6 is a block diagram of an exemplary hardware monitoring system which may be utilized by the information handling systems shown in FIGS. 1 through 4.

Turning now to FIG. 6, a block diagram depicting a typical hardware management system is shown. The hardware management system 300 may, for example, monitor the operation of an information handling system (see FIGS. 1 through 4) for events or conditions requiring the system to be shut down or reset and may be utilized to implement the adaptive shutdown system and method of the present invention. The A information handling system (see FIGS. 1 through 5) may include a multiprocessor system 310 having two or more processors 312, 314 & 316. These processors 312, 314 & 316 may be located in either the servers or the client workstations of the information handling system so that processing of information may be shared in accordance with the client/server architecture described in connection with FIG. 1. Preferably, the hardware management system 300 comprises a combination of hardware and software for monitoring key parameters and functions of the information handling system. For example, aspects of the hardware management system 300 may be implemented as a software application which is executed by one or more of the processors 312, 314 & 316 of the multi-processor system 310. This software may monitor each processor 312, 314 & 316 of the multiprocessor system 310 for proper operation and may perform a shutdown or reset of the system if an out-of-tolerance condition is detected. The hardware management system 300 may also include a processing device such as, for example, a microprocessor or microcontroller 318. The micro-controller 318 may be coupled to an array of integrated sensors 320,322 & 324 for monitoring key environmental parameters such as processor temperature, fan operation, system voltage, or the like.

Preferably, if any of the monitored parameters exceed a user-selected range of tolerances, the hardware management system 300 may provide a warning to a user of the information handling system, such as the system administrator, for example, who may then implement corrective action before the out-of-tolerance condition leads to system failure and possible loss of data or damage to system components. Additionally, the hardware management system 300 may automatically shut down and/or reset the information handling system (e.g., to take a processor 312, 314 & 316 of the multi-processor system 310 off-line) when it detects a condition wherein a monitored parameter falls outside of a user-selected threshold or tolerance. For example, upon detecting an out-of-tolerance condition or event, the hardware management system 300 may inform the microcontroller 318 that a specific processor 312, 314 & 316 is to be shut down. Preferably, the microcontroller 318 is also informed of the time interval to wait before shutting down or resetting the information handling system. The microcontroller 318 may wait for the specified time interval before shutting down or resetting the system. Preferably, the microcontroller 318 may also set a malfunctioning processor's voltage regulator module (VRM) to off so that the processor is taken off-line when the system is reset and restarted. When the information handling system restarts, its system BIOS (Basic Input/Output System) and operating system may automatically operate without the now off-line processor.

Figure 7:
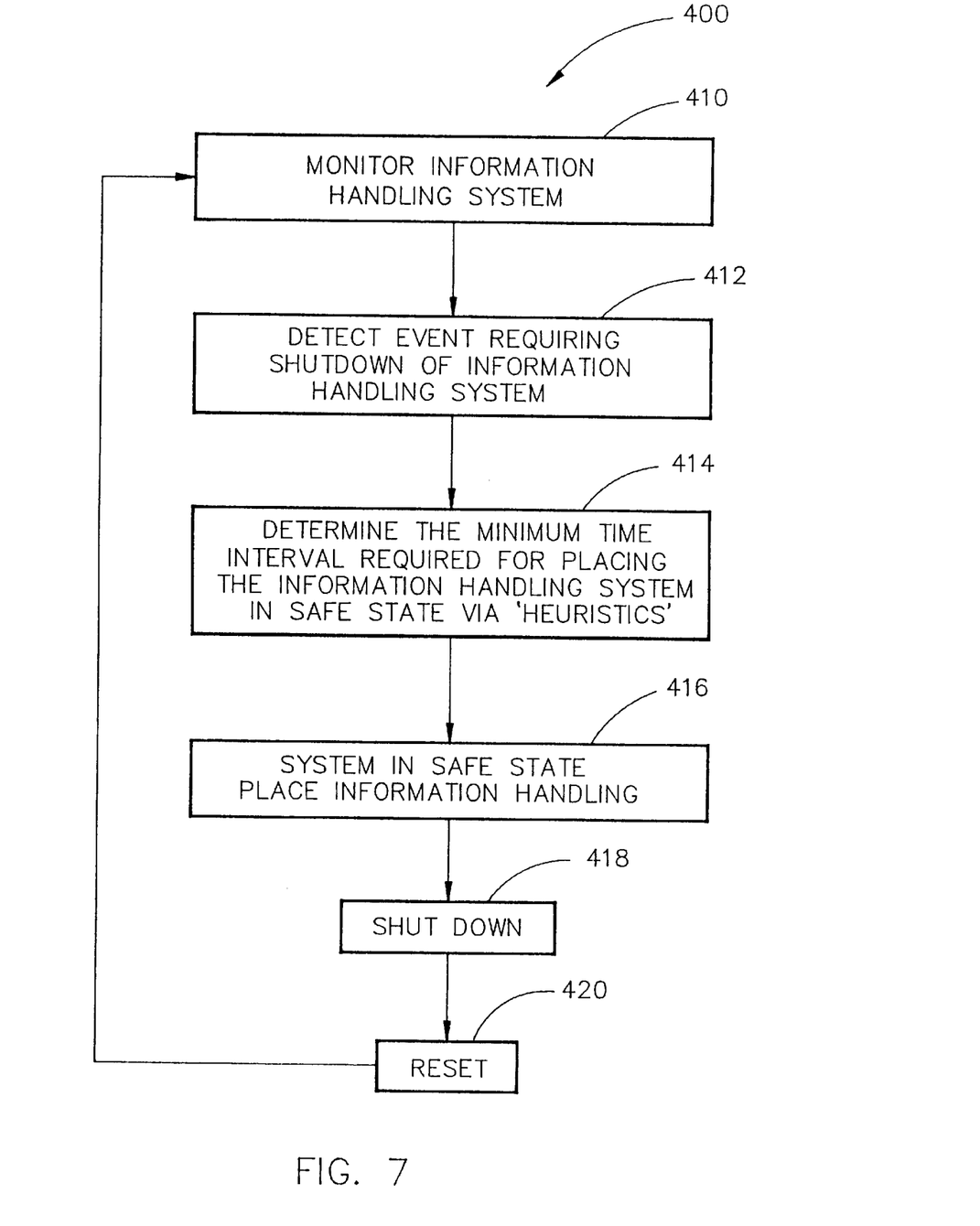
FIG. 7 is a flow diagram illustrating an exemplary method for implementing an adaptive shutdown of an information handling system such as the systems shown in FIGS. 1 through 4.

Referring now to FIG. 7, an exemplary method for effecting an adaptive shutdown of an information handling system is shown. The method 400 may, for example, be implemented in an information handling system via the hardware management system 300 shown in FIG. 6. The hardware management system 300 may monitor the information handling system at step 410 for a condition or event which would require the system be shut down or reset. When such an event or condition is detected at step 412, a minimum time interval required for placing the information handling system in a safe state wherein all user applications are closed and all information is saved to a non-volatile location is determined at step 414. Preferably, in order to calculate this time interval, heuristics may be determined for various operating systems, applications, application environments, and the like. These heuristics preferably lead to a correct determination of the time interval by implementing a non-rigorous or self-learning approach. For example, in a preferred embodiment, the determination of the time interval may be based on the premise that the time required for a given high-end, multi-user operating system to reach a "safe" state (wherein all information is saved to non-volatile locations), after being instructed to enter such a state, is a function of the number (amount), type, and state of various system resources such as, for example, clients, virtual memory, open network sockets, processors, threads, and the like. For example, a value for the time interval (TSD) may be calculated as follows:

$$T_{SD}=(V_1 \cdot T_1)+(V_2 \cdot T_2)+ \ldots (V_N \cdot T_N) \quad (EQ. 1)$$

where $V_{(1 \ldots N)}$ is a variable representing the number of each type of system resource and $T_{(1 \ldots N)}$ represents a time constant for each variable V. Preferably, the time constant $T_{(1 \ldots N)}$ may be determined by experimentation or by utilizing data supplied by the operating system or application vendors for a given operating system with representative applications. Preferably, the time interval $T_{SD}$ may be continuously recalculated as system requirements and resources change. Shutdown of the information handling system may then be delayed for the time interval value $T_{SD}$ determined at step 414 while the information handling system is placed in the safe state by storing all information stored in volatile memory to non-volatile memory (e.g., disk drives, etc.) at step 416. The information handling system may then be shut down at step 418 after the time interval $T_{SD}$ determined at step 414 has elapsed. After shutdown, the information management system may be reset at step 420, whereupon the event or condition which originally caused the shutdown has preferably been corrected. The information handling system may then be monitored for future events which would require the system to again be shut down or reset.

The present invention may be utilized in conjunction with a UPS, as shown in FIGS. 2 and 3, in which it is necessary to know how long the various components of an information handling system must continue to operate after an event occurs which requires the system to be powered down. As shown in FIG. 7, the time interval $T_{SD}$ determined at step 414 may be provided to the UPS after an event requiring the information handling system to shut down is detected at step 412. The UPS may then delay powering down the information handling system for the time interval $T_{SD}$ while the information handling system is placed in the safe state by storing all information to non-volatile locations (e.g., disk drives, etc.) at step 416. The UPS may then power down the information handling system at step 418 after the time interval $T_{SD}$ has elapsed. After shutdown, the information management system may be reset and powered on by the UPS at step 420, whereupon the event or condition which originally caused the shutdown has preferably been corrected. As shown in FIG. 4, a UPS may provide power to several workstations of a network system. Utilizing the present invention, such a UPS might allow some workstations to power off sooner than others as those workstations reach a safe state (e.g., all data has been stored to a non-volatile location), thus maximizing the available reserve battery capacity of the UPS.

A specific example wherein the method shown in FIG. 7 may be used to shut down and/or reset an information handling system is now provided for illustration. The hardware management system 300, shown in FIG. 6, may monitor, among other parameters, the operation of cooling fans which provide cooling to each processor of the information handling system. The hardware management system may, for example, detect that the cooling output of a cooling fan associated with a particular processor has decreased to a point where the fan is no longer providing sufficient cooling to that processor. Consequently, the hardware management system may cause the affected processor to be taken off line to prevent damage due to insufficient cooling. A minimum time interval required for placing the information handling system in a safe state wherein all information stored in a volatile location is saved to a non-volatile location (e.g., a disk drive, etc.) may then be determined using a survey of the current system resources in use. For example, the time interval may be calculated for an exemplary information handling system as follows:

Time Interval=NumberOfUsers·EACH_USER_TIME_CONSTANT+

OpenSQLClients·EACH_SQL_CLIENT_TIME_CONSTANT+

SystemVirtualMemoryMbytes·EACH_MB_VM_TIME_

CONSTANT+NumberOfProcessors·EACH_PROCESSOR_TIME_

CONSTANT+NumberOfhreads·EACH_THREAD_TIME_CONSTANT (EQ. 2)

wherein the Variable and TIME_CONSTANT values correspond to $V_{(1 \ldots N)}$ and $T_{(1 \ldots N)}$ of Equation. 1, respectively.

By way of example only, if the TIME_CONSTANT values are determined, based on experimentation and/or data supplied by operating system or application vendors for a given operating system with representative applications, to be as follows:

| | |
|---|---|
| EACH_USER_TIME_CONSTANT | 0.01 seconds |
| EACH_SOL_CLIENT_TIME_CONSTANT | 0.01 seconds |
| EACH_MB_VM_TIME_CONSTANT | 0.02 seconds |
| EACH_PROCESSOR_TIME_CONSTANT | 0.05 seconds |
| EACH_THREAD_TIME_CONSTANT | 0.025 seconds | and the Variable values are determined to be (at the time shutdown of the information handling system was initiated):

| | |
|---|---|
| NumberOfUsers= | 200 |
| OpenSQLClients= | 100 |
| SystemVirtualMemoryMbytes= | 4096 |
| NumberOfProcessors= | 6 |
| NumberOfThreads= | 300 | the Time Interval calculated would be:

Time Interval = 200·0.01 +

100·0.01 +

4096·0.03 +

6·0.05 +

300·0.025 = 133.680 seconds.

The hardware management system then instructs the host operating system to close all network connections, close user applications, and flush volatile data to non-volatile locations so that the host operating system reaches a zero data loss state in less than 133.680 seconds. When the determined time interval (133.680 seconds) elapses, the hardware management system microcontroller automatically shuts down and resets the system (with the affected processor off-line). Preferably, the information handling system is in a safe state before the reset occurs, since the hardware management system microcontroller, in the exemplary embodiment, resets the information handling system automatically,. As the operating system restarts, the affected processor is no longer present (to the operating system) and operating system functions resume with fewer processors on-line.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 204 of one or more computer systems configured generally as described in FIG. 5. Until required by the computer system, the set of instructions may be stored in another computer readable memory such as the auxiliary memory of FIG. 5, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the method and apparatus of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for effecting a shutdown of an information handling system, the method comprising:

detecting a condition requiring the information handling system to be shut down;

determining a minimum time interval required for placing the information handling system in a safe state wherein all information stored in volatile memory is stored in non-volatile memory;

while delaying shutdown of the information handling system for the determined time interval, placing the information handling system in the safe state; and effecting a shutdown of the information handling system after the determined time interval has elapsed;

wherein the determining step comprises using a heuristic for calculating the minimum time interval required for placing the information handling system in the safe state; and wherein the minimum time interval is calculated by summing the products of one or more variables each representing the number of a type of system resource and a time constant corresponding to that variable.

2. A method according to claim 1, further comprising the step of resetting the information handling system.

3. A method according to claim 1, wherein the effecting step comprises shutting down a server and at least one workstation forming the information handling system.

4. A method according to claim 1, wherein the effecting step comprises shutting down a server and at least two workstations forming the information handling system wherein the workstations are powered by a common power supply.

5. A method according to claim 4, wherein the effecting step further comprises shutting down each of the at least two workstations independently when that workstation is placed in a safe state.

6. A method for effecting a shutdown of an information handling system, the method comprising:

detecting a condition requiring the information handling system to be shut down;

determining a minimum time interval required for placing the information handling system in a safe state wherein all information stored in volatile memory is stored in non-volatile memory;

while delaying shutdown of the information handling system for the determined time interval, placing the information handling system in the safe state; and effecting a shutdown of the information handling system after the determined time interval has elapsed;

wherein the determining step comprises using a heuristic for calculating the minimum time interval required for placing the information handling system in the safe state; and wherein the minimum time interval is determined from the equation:

$$T_{SD}=(V_1 \cdot T_1)+(V_2 \cdot T_2)+ \ldots (V_N \cdot T_N)$$

where $T_{SD}$ is the minimum time interval, $V_{(1 \ldots N)}$ is a variable representing the number of each type of system resource, and $T_{(1 \ldots N)}$ is a time constant for each variable V.

7. A method according to claim 6, further comprising the step of resetting the information handling system.

8. A method according to claim 6, wherein the effecting step comprises shutting down a server and at least one workstation forming the information handling system.

9. A method according to claim 6, wherein the effecting step comprises shutting down a server and at least two workstations forming the information handling system wherein the workstations are powered by a common power supply.

10. A method according to claim 9, wherein the effecting step further comprises shutting down each of the at least two workstations independently when that workstation is placed in a safe state wherein all volatile information stored on that workstation is saved to a nonvolatile location.

11. A computer readable medium whose contents cause an information handling system to execute method steps for effecting a shutdown of the information handling system, the method steps comprising:

detecting a condition requiring the information handling system to be shut down;

determining a minimum time interval required for placing the information handling system in a safe state wherein all volatile information is saved to non-volatile memory;

while delaying shutdown of the information handling system for the determined time interval, placing the information handling system in the safe state; and effecting a shutdown of the information handling system after the determined time interval has elapsed;

wherein the determining step comprises using a heuristic for calculating the minimum time interval required for placing the information handling system in the safe state wherein all volatile information is saved to a non-volatile location; and wherein the minimum time interval is calculated by summing the products of one or more variables each representing the number of a type of system resource and a time constant corresponding to that variable.

12. The computer readable medium according to claim 11, whose contents further cause the information handling system to perform the step of resetting the information handling system.

13. The computer readable medium according to claim 11, wherein the effecting step comprises shutting down a server and at least one workstation forming the information handling system.

14. The computer readable medium according to claim 11, wherein the effecting step comprises shutting down a server and at least two workstations forming the information handling system wherein the workstations are powered by a common power supply.

15. The computer readable medium according to claim 14, wherein the effecting step further comprises shutting down each of the at least two workstations independently when that workstation is placed in a safe state wherein all volatile information stored on that workstation is saved to a nonvolatile location.

16. A computer readable medium whose contents cause an information handling system to execute method steps for effecting a shutdown of the information handling system, the method steps comprising:

detecting a condition requiring the information handling system to be shut down;

determining a minimum time interval required for placing the information handling system in a safe state wherein all volatile information is saved to non-volatile memory;

while delaying shutdown of the information handling system for the determined time internal, placing the information handling system in the safe state; and effecting a shutdown of the information handling system after the determined time interval has elapsed;

wherein the determining step comprises using, a heuristic for calculating the minimum time interval required for placing the information handling system in the safe state wherein all volatile information is saved to a non-volatile location; and wherein the minimum time interval is determined from the equation:

$$T_{SD} = (V_1 \cdot T_1) + (V_2 \cdot T_2) + \ldots (V_N \cdot T_N)$$

where $T_{SD}$ is the minimum time interval, $V_{(1 \ldots N)}$ is a variable representing the number of each type of system resource, and $T_{(1 \ldots N)}$ is a time constant for each variable V.

17. The computer readable medium according to claim 16, whose contents further cause the information handling system to perform the step of resetting the information handling system.

18. The computer readable medium according to claim 16, wherein the effecting step comprises shutting down a server and at least one workstation forming the information handling system.

19. The computer readable medium according to claim 16, wherein the effecting step comprises shutting down a server and at least two workstations forming the information handling system wherein the workstations are powered by a common power supply.

20. The computer readable medium according to claim 19, wherein the effecting step further comprises shutting down each of the at least two workstations independently when that workstation is placed in a safe state wherein all volatile information stored on that workstation is saved to a nonvolatile location.

21. An information handling system, comprising:

means for detecting an event requiring the information handling system to be shut down;

means for determining a minimum time interval required for placing the information handling system in a safe state wherein all information stored in volatile memory is stored in non-volatile memory;

means for placing the information handling system in the safe state while delaying shutdown of the information handling system for the determined time interval; and means for effecting a shutdown of the information handling system after the determined time interval has elapsed;

wherein the determining means comprises means for using a heuristic for calculating the minimum time interval required for placing the information handling system in the safe state wherein all volatile information is saved to a non-volatile location; and wherein the minimum time interval is calculated by summing the products of one or more variables each representing the number of a type of system resource and a time constant corresponding to that variable.

22. The information handling system according to claim 21, further comprising means for resetting the information handling system.

23. The information handling system according to claim 21, comprising a server and a workstation forming the information handling system.

24. The information handling system according to claim 21, comprising a server and at least two workstations wherein the workstations are powered by a common power supply.

25. The information handling system according to claim 24, wherein the shutdown effecting means comprises means for shutting down each of the at least two workstations independently when that workstation is placed in a safe state wherein all volatile information utilized by the workstation is saved to a nonvolatile location.

26. An information handling system, comprising:

means for detecting an event requiring the information handling system to be shut down;

means for determining a minimum time interval required for placing the information handling system in a safe state wherein all information stored in volatile memory is stored in non-volatile memory;

means for placing the information handling system in the safe state while delaying shutdown of the information handling system for the determined time interval; and means for effecting a shutdown of the information handling system after the determined time interval has elapsed;

wherein the determining means comprises means for using a heuristic for calculating the minimum time interval required for placing the information handling system in the safe state wherein all volatile information is saved to a non-volatile location; and wherein the minimum time interval is determined from the equation:

$$T_{SD}=(V_1 \cdot T_1)+(V_2 \cdot T_2)+\ldots(V_N \cdot T_N)$$

where $T_{SD}$ is the minimum time interval, $V_{(1 \ldots N)}$ is a variable representing the number of each type of system resource, and $T_{(1 \ldots N)}$ is a time constant for each variable V.

27. The information handling system according to claim 26, further comprising means for resetting the information handling system.

28. The information handling system according to claim 26, comprising a server and a workstation forming the information handling system.

29. The information handling system according to claim 26, comprising a server and at least two workstations wherein the workstations are powered by a common power supply.

30. The information handling system according to claim 29, wherein the shutdown effecting means comprises means for shutting down each of the at least two workstations independently when that workstation is placed in a safe state wherein all volatile information utilized by the workstation is saved to a nonvolatile location.

31. An information handling system, comprising:

a workstation configured to allow a user to access the information handling system; and a server interconnected to the workstation configured to detect a condition requiring the information handling system to be shut down, determining a minimum time interval required for placing the information handling system in a safe state wherein all volatile information is saved to a non-volatile location, and effecting a shutdown of the information handling system after the determined time interval has elapsed;

wherein the server is configured to determine a heuristic for calculating the minimum time interval required for placing the information handling system in the safe state wherein all volatile information is saved to a non-volatile location; and wherein the minimum time interval is calculated by summing the products of one or more variables each representing the number of a type of system resource and a time constant corresponding to that variable.

32. The information handling system of claim 31, wherein the server resets the information handling system.

33. The information handling system of claim 31, further comprising a power supply for providing electrical power to the server.

34. The information handling system of claim 31, wherein the server effects a shutdown of the workstation by causing the power supply to interrupt the supply of electrical power to the workstation.

35. The information handling system of claim 33, wherein the server effects a shutdown of the information handling system by causing the power supply to interrupt the supply of electrical power to the server.

36. The information handling system of claim 35, wherein the power supply also provides electrical power to the workstation.

37. An information handling system, comprising:

a workstation configured to allow a user to access the information handling system; and a server interconnected to the workstation configured to detect a condition requiring the information handling system to be shut down, determining a minimum time interval required for placing the information handling system in a safe state wherein all volatile information is saved to a non-volatile location, and effecting a shutdown of the information handling system after the determined time interval has elapsed;

wherein the server is configured to determine a heuristic for calculating the minimum time interval required for placing the information handling system in the safe state wherein all volatile information is saved to a non-volatile location; and wherein the minimum time interval is determined from the equation:

$$T_{SD}=(V_1 \cdot T_1)+(V_2 \cdot T_2)+\ldots(V_N \cdot T_N)$$

where $T_{SD}$ is the minimum time interval, $V_{(1 \ldots N)}$ is a variable representing the number of each type of system resource, and $T_{(1 \ldots N)}$ is a time constant for each variable V.

38. The information handling system of claim 37, wherein the server resets the information handling system.

39. The information handling system of claim 37, further comprising a power supply for providing electrical power to the server.

40. The information handling system of claim 37, wherein the server effects a shutdown of the workstation by causing the power supply to interrupt the supply of electrical power to the workstation.

41. The information handling system of claim 39, wherein the server effects a shutdown of the information handling system by causing the power supply to interrupt the supply of electrical power to the server.

42. The information handling system of claim 41, wherein the power supply also provides electrical power to the workstation.

43. An information handling system, comprising:

a processing system;

non-volatile memory interconnected with the processing system, and a hardware management system interconnected with the processing system and memory, said hardware management system configured to detect an event requiring the information handling system to be shut down, determine a minimum time interval required for placing the information handling system in a safe state wherein all information stored in volatile memory is stored to non-volatile memory, and effect a shutdown of the information handling system after the determined time interval has elapsed;

wherein the hardware management system is configured to determine a heuristic for calculating the minimum time interval required for placing the information handling system in the safe state wherein all volatile information is saved to a non-volatile location; and wherein the minimum time interval is calculated by summing the products of one or more variables each representing the number of a type of system resource and a time constant corresponding to that variable.

44. The information handling system of claim 43, wherein the hardware management system resets the information handling system.

45. The information handling system of claim 43, further comprising a power supply for providing electrical power to the information handling system.

46. The information handling system of claim 43, wherein the hardware management system effects shutdown of the information handling system by causing the power supply to interrupt the supply of electrical power thereto.

47. An information handling system, comprising:

a processing system;

non-volatile memory interconnected with the processing system, and a hardware management system interconnected with the processing system and memory, said hardware management system configured to detect an event requiring the information handling system to be shut down, determine a minimum time interval required for placing the information handling system in a safe state wherein all information stored in volatile memory is stored to non-volatile memory, and effect a shutdown of the information handling system after the determined time interval has elapsed;

wherein the hardware management system is configured to determine a heuristic for calculating the minimum time interval required for placing the information handling system in the safe state wherein all volatile information is saved to a non-volatile location; and wherein the minimum time interval is determined from the equation:

$$T_{SD} = (V_1 \cdot T_1) + (V_2 \cdot T_2) + \ldots (V_N \cdot T_N)$$

where $T_{SD}$ is the minimum time interval, $V_{(1 \ldots N)}$ is a variable representing the number of each type of system resource, and $T_{(1 \ldots N)}$ is a time constant for each variable V.

48. The information handling system of claim 47, wherein the hardware management system resets the information handling system.

49. The information handling system of claim 47, further comprising a power supply for providing electrical power to the information handling system.

50. The information handling system of claim 47, wherein the hardware management system effects shutdown of the information handling system by causing the power supply to interrupt the supply of electrical power thereto.

* * * * *